Figure 1:
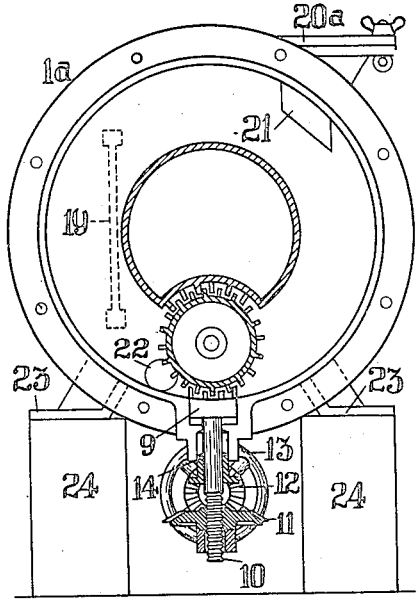

H. PLAUSON.
RECLAIMING RUBBER.
APPLICATION FILED FEB. 12, 1921.

1,432,895.

Patented Oct. 24, 1922.
4 SHEETS—SHEET 1.

Inventor.
Hermann Plauson
by
Knight Bro
attys

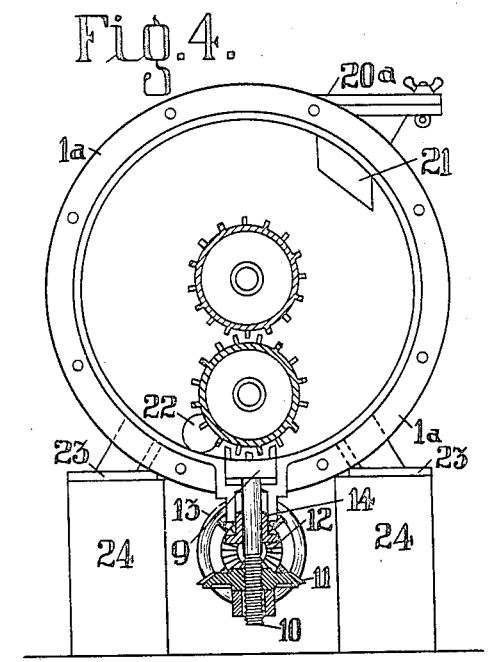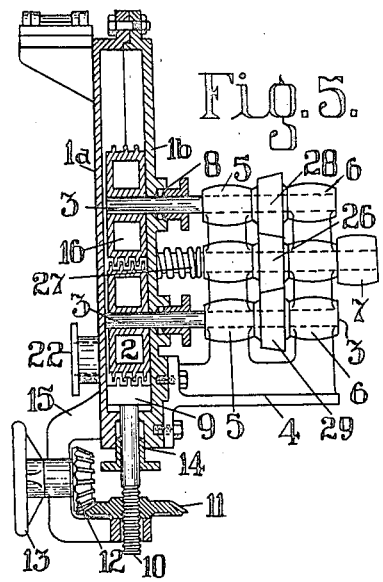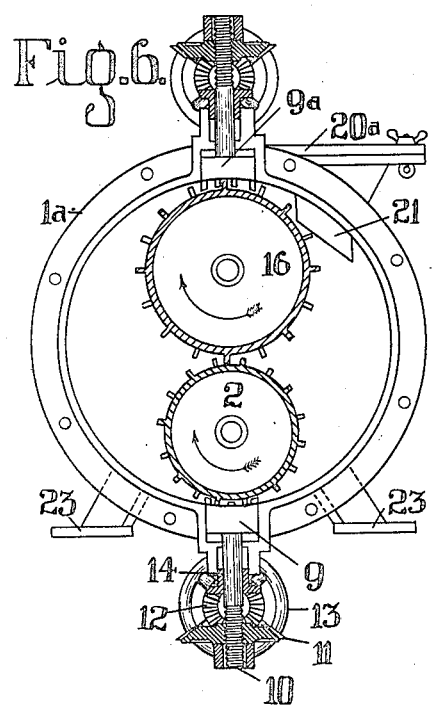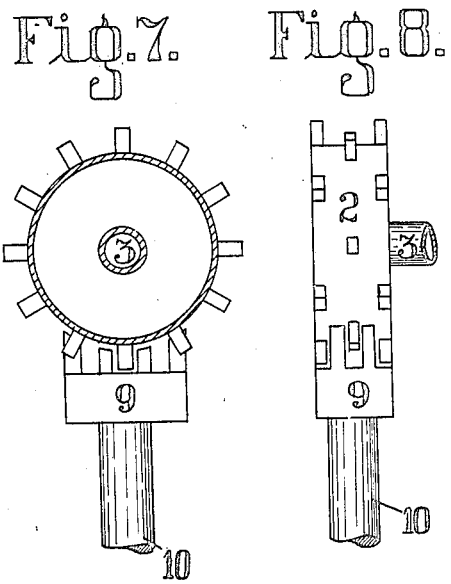

H. PLAUSON.
RECLAIMING RUBBER.
APPLICATION FILED FEB. 12, 1921.
1,432,895.
Patented Oct. 24, 1922.
4 SHEETS—SHEET 4.
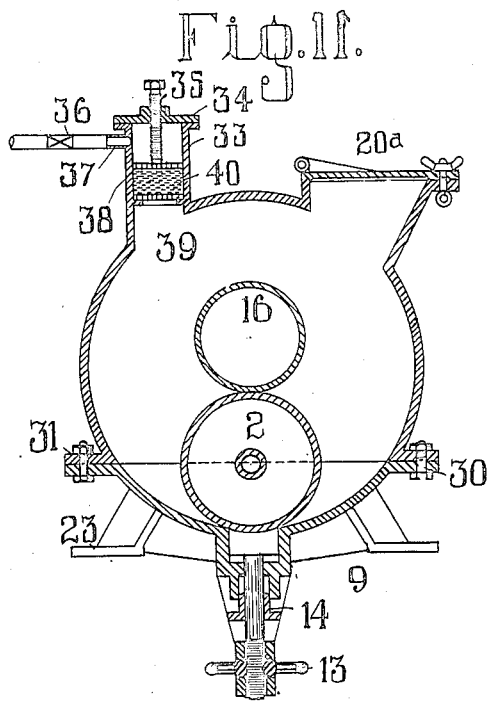
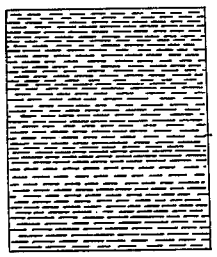
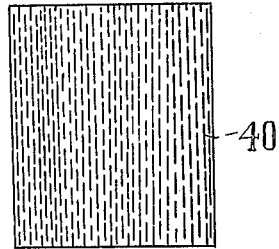
Inventor
Hermann Plauson
by
[signature] attys.

Patented Oct. 24, 1922.

1,432,895

UNITED STATES PATENT OFFICE.

HERMANN PLAUSON, OF HAMBURG, GERMANY.

RECLAIMING RUBBER.

Application filed February 12, 1921. Serial No. 444,488.

*To all whom it may concern:*

Be it known that I, HERMANN PLAUSON, Esthonian subject, residing at Hamburg, Germany, have invented certain new and useful Improvements in Reclaiming Rubber, (for which I have filed application in Germany Apr. 23, 1918), of which the following is a specification.

Many processes are known which reclaim waste rubber in the compact, crumb or powdered form at high temperature and (or) pressure, but the object of the present invention is to provide a reclaiming process which will furnish a useful reclaimed rubber, even from waste ebonite, at temperatures below 100 degrees C. or even at atmospheric temperature.

According to the present invention therefore the waste rubber or ebonite is treated with suitable liquid at temperatures between 15 degrees and 120 degrees C. without application of pressure but in an extraordinarily finely divided "disperse" state. This has the great advantage that the use of high temperature and pressure is avoided and the properties of the raw material are not changed so much as is otherwise the case.

According to the invention a reclaimed rubber is obtained in a very simple way which has almost the same chemical properties as the initial rubber but that its colloidal chemical properties are different.

This only applies when the waste rubber used has not been exhaustively vulcanized or subjected to the so-called after-vu'canization at high temperatures for a long time since in that case the reclaimed rubber obtained is to be regarded as a polymer of natural rubber it is insoluble in the ordinary rubber solvents and its colloidal properties are also different.

The essential feature of the present invention consists in applying an extraordinarily intensive mechanical disintegration preferably in the so-called colloid mill described in my co-pending application Serial No. 437,117, filed January 13th, 1921, (Case 14) to a mixture of waste rubber with a large quantity of certain liquids such as water and preferably in presence of certain added substances as will be hereafter described.

A convenient liquid to use is water and the added substances may consist of bodies which accelerate dispersion or otherwise favourably influence the process, e. g. small quantities of soaps from fats, resins, naphthenic acid or the like, or their raw materials, or colloids such as glue, starch, dextrin, albumen, casein, resin emulsions, rubber latex, disulpho-naphthenic acids or their alkali compounds.

Further ammonium sulphide, ammonia or organic amines such as methylamine, ethylamine, etc., or pure alkalis, soda, potash, etc., can be added as chemical reagents. These compounds of an alkaline nature or other suitable compounds can be used to combine with the sulphur extracted.

Further a swelling agent or a solvent for hard or soft rubber can be employed such as benzene, xylene, pseudo-cumene, dichlorhydrin, aniline, toluidine, xylidine, phenol, cresol, etc., tar-oils, resin-oils or vegetable oils.

The result of such treating is to yield a homogeneous product resembling rubber latex. This extraordinary fine division of the rubber is termed "high dispersion" in the language of colloidal chemistry. The liquid such as water is termed the dispersion medium.

It was not known and it could not have been foreseen that it would be possible to effect such a thorough high dispersion of rubber (either waste rubber or unvulcanized rubber or ebonite) that a product would be obtained which resembles latex and may be considered as a colloidal solution of rubber so that the rubber is practically in the hydrosol or organosol form. Further important features of the invention are the application of natural colloids and (or) saponifying agents such as soaps or swelling agents or solvents for accelerating the dispersion. It is further found that in addition to the hard or soft rubber, the free sulphur is also obtained in the colloidal form.

The above treatment forms the nucleus of the invention but means are employed to remove sulphur, for instance alkaline reagents may be added or the colloidal sulphur may be removed in the state of colloidal suspension in the dispersion medium. Further, by treatment with suitable means, the extremely finely divided rubber can be desulphurized.

The dispersion process can be accelerated by heating to about 100 degrees C. but in this case disintegration must be continued while the mixture is cooling since the degree of dispersion is influenced by heat.

In the accompanying drawings, Figures 1–10 show percussion machines; Figure 11 a grinding machine and Figures 12 and 13 are valves.

Figure 2:
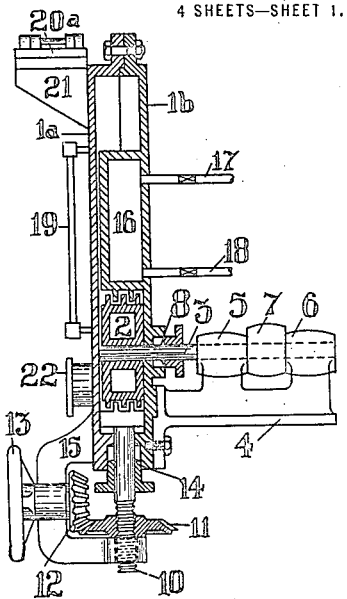

In Figures 1 and 2, 1 represents the machine casing which is made in two parts 1ᵃ and 1ᵇ, 2 is the rotating part of the beater mill, 3 its shaft, 4 brackets for bearings, 5, 6 bearings for the shaft 3, 7 belt pulley, 8 stuffing box for the shaft packing, and 9 the regulatable stationary beater abutment. This has also beater arms or pins which pass exactly into the intervals of the rotating arms. The regulation is effected by means of a spindle 10 provided on the fixed abutment 9, on the lower end of which spindle a thread is provided which can be turned to right or left by means of a lateral horizontally placed bevelled spur wheel 11, a vertical spur wheel 12 and a hand wheel 13 which latter is supported by a bracket 15 whereby the beater abutment 9 can be raised or lowered. A stuffing box 14 is provided for a spindle 1ᵃ. 16 is a fixed internal hollow cylinder, the object of which is in the first place to distribute the liquid in the mill so that a free cylindrical ring or annular space is formed for the liquids to be beaten. By the action of centrifugal force, due to the rotation of the beater 2, the liquid receives a circular direction of travel about the cylindrical centre piece 16 and is constantly being returned to the beating place. In Figure 1, the lower part of the hollow stationary cylinder, which is located in the centre, is shaped and provided with beaters to co-act with the rotating part of the plunger 2. By this means, not only is a double beater action obtained, but also a more energetic effect of rotation of the dispersion medium with the substances to be dispersed.

The hollow centre piece is steam tight and may be connected by pipes 17 and 18 through valves with a steam pipe or with cooling water, whereby a uniform heating or cooling during the beating may be obtained.

In order to enable the level of the liquid to be observed, a liquid gauge glass 19 is provided and this arrangement also permits of the taking of samples for tests.

The material to be dispersed may be slowly introduced through the feed device 20, 21, which may be made fluid-tight through the cover 20ᵃ, and the finished mixture is discharged through the outlet mechanism 22, provided with a wedge valve.

The entire machine may be mounted on a base 23, 24, so high that the valve control is clear of the ground. The machine is filled up to from ⅓ to ⅔ of its height and then the beating is commenced; the liquid is thereby set in strong circulatory movement and repeatedly subjected to the beating action until the desired degree of dispersion is obtained.

Figure 3:
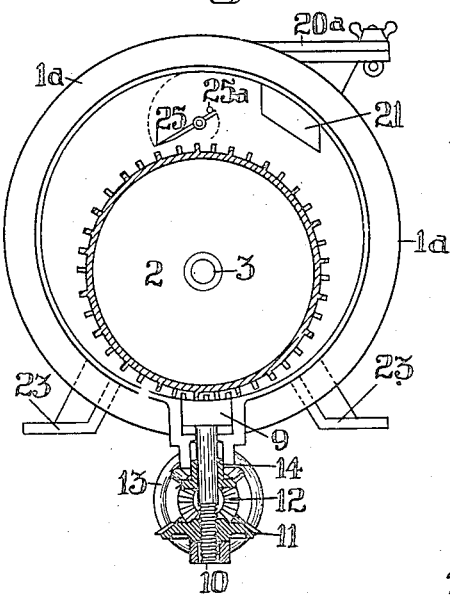

In Figure 3, instead of the central fixed cylinder 16, a knife 25 is used which is adapted to be moved about an axis and which is prevented by means of two pins 25ᵃ from encountering the beater.

In the modified construction of Figures 4 and 5, the uniform rotation of both beaters is obtained by means of a conical friction disc 26 under control of spring 27 which disc engages two reversely conical driven discs 28 and 29 (Figure 5). Now when the central cone is set in rapid rotation from the driven belt pulley 7, the two other conical discs 28 and 29 are also set in rotation by frictional contact. In the case of a temporary over-load the spring 27 can yield, whereby an automatic compensation is possible.

Figure 6 shows the same machine, modified in that the two rotating parts are of different sizes and divide the entire casing into two parts whereby three beating places are formed. Further fixed adjustable beating resistances are shown at two places.

The beater or grinding area is shown in detail in Figures 7 and 8. The separate bars of the adjustable but non-rotating beating abutments 9 are so arranged that they come exactly between the rows of the rotating parts leaving larger or smaller intermediate spaces according to the predetermined adjustment. Preliminary and fine grinding up to a sufficient degree of dispersion may thereby be effected in one and the same machine. The regulating device must, however, be so constructed that even with the finest adjustment possible, there is no possibility that the beater arms meet one another.

Figure 9:
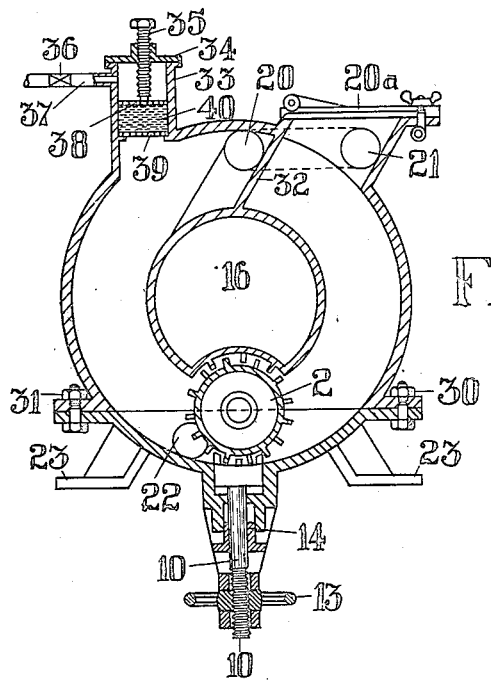
Figure 10:
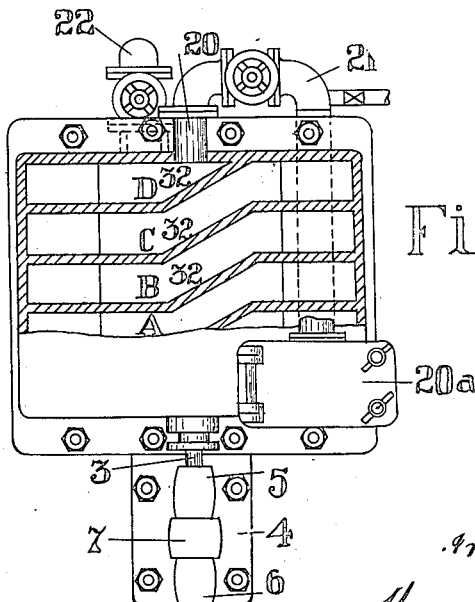

Figures 1 to 6 illustrate types of non-continuously working machines. For substances which are very easily dispersed, machines may be constructed which are based on the same principle but which can be employed separately or in series. Such a dispersion machine is shown in Figures 9 and 10. The dispersion medium with the substances to be dispersed drops through an opening 21 into the mill at the beating place 9 and are then subjected to the beating action and then thrown by centrifugal force through an opening 20 into the next compartment B and from B again into C and so forth until they finally come into the collecting vessel through an opening 22 in the compartment D, or through a connecting pipe 20, 21 and returned to the compartment A. (In order that the internal construction may be better understood a portion of the mounting in Figure 10 is omitted.) To prevent the liquid falling back to the other side of the separate compartments, an inclined partition 32 or the like is provided at the upper opening 20. The machine has as many rotating dismembering discs as there are compartments. To mount these on a shaft and to make the machine compact the machine is cast in two parts held together by means of bolts 30 and 31.

A considerable acceleration of the process is obtained by working under vacuum, and further under vacuum it is possible to treat dry material. Hitherto the difficulty of vacuum grinding was that the finest particles were carried away with the air or gas formed.

This difficulty is avoided by the provision of a filter as shown in Figures 9, 11, 12 and 13. In a projection 33 of the casing of the machine, there is a perforated plate 39 on projecting bars, and over this plate a plurality of thin filter plates 40 provided with elongated narrow slots, as shown in Figures 12 and 13 are arranged alternately with the slots in a longitudinal and transverse direction, and over them again a perforated plate 38. The whole is pressed firmly together by means of a pressure screw 35 located in the cover 34. The filter thus formed, which may, if desired, be coated with suitable elements (cement and the like), is absolutely tight to the finest dust and even to colloids. The vacuum pump is connected to the pipe 37 which is adapted to be closed by means of a valve 36.

Air and any gas formed in the interior of the machine is drawn off in this way without a trace of the dispersion material passing through.

Instead of dispersion machines with a beater action, such machines may be constructed with a frictional action. The construction of such machines may be similar to that of the beater arm. Such a machine is illustrated diagrammatically in Figure 11. As may be seen from the drawings, the machine hardly differs from the others except by the omission of the beater arms on the dismembering disc and on the regulatable frictional abutment. The abutment is here controlled directly (Figure 11) but may, however, also be made in the manner shown in Figures 1 to 6. The rotating friction disc may also be larger or smaller than the stationary one, other conditions remaining the same.

The process will be understood better by a consideration of the following examples.

*Example 1.*

10 parts of ammonium sulphide, 1 part of caustic alkali and 2 parts of potash soap are dissolved in 100 parts of water. At a temperature of 100 to 110 degrees C. there is then added 10 parts of vulcanized soft rubber, e. g. waste rubber from automobile tires in the crumb or granular form. This mixture is then intensively mechanically disintegrated preferably in a colloid mill; the mixture may be passed through a disintegrator of the beater type in which the beater arms run in liquid at very high speed (peripheral speed of 2000 metres per minute) and pumped by a mud pump into a reservoir and then continuously circulated between the reservoir and the disintegrator. It is preferably but not essential to heat the reservoir and liquid by steam to 100 to 110 degrees C. The rubber and liquid form a homogeneous mass even after disintegration for half an hour. After one hour, an emulsion-like appearance is observed and the free sulphur has already been extracted and is present partly in the colloidal form and partly dissolved by the ammonium sulphide. Further treatment depends on the final product desired.

The mixture may be cooled by the addition of cold water with continual disintegration, and the majority of the liquid containing the free sulphur in the colloidal and dissolved form may be removed by filtration and pressure or the sulphur can be extracted from the emulsion with organic sulphur solvents. The rubber mass can be treated for a second time in the same dispersion medium for several hours with fresh addition of alkali when the chemically combined sulphur is partly removed.

By increasing the addition of alkali to about 10 parts, almost the whole of the free and combined sulphur can be removed by a single disintegration. An alkali sulphide solution can also be employed instead of alkali and ammonium sulphide.

Dispersion accelerators can also be added instead of soaps and swelling agents or solvents are suitable for this purpose, e. g. benzene, toluene, xylene, pseudo-cumene, mesitylene, tar oils, resin oils, vegetable oils, dichlorhydrin, aniline, toluidine, xylidine, phenol, cresol, etc. These substances can also be used in admixture with those specified above. By addition of 10 parts of benzene or xylene, etc., and 5 to 10 parts of caustic alkali, the extraction of sulphur can be performed without addition of ammonium sulphide.

It has further been demonstrated that the vulcanized soft rubber can be highly dispersed in ordinary water without addition of alkali if one of the above mentioned dispersion accelerators, preferably colloids such as colophony, glue, gelatine, cassin, protein, etc., is added together with 5 to 10% of one of the specified hydrocarbons. The process is however always accelerated by the addition of alkalis.

*Example 2.*

1 to 3 parts of glue, gelatine, cassin, protein or colophony are dissolved or emulsified in 100 parts of water and 3 to 5 parts of phenol or cresol are added together with 5 to 8 parts of soft rubber in the form of crumb or powder and the mixture is intensively disintegrated as in Example 1 at about 100 to 120 degrees C. A fine rubber emulsion is obtained in 3 to 4 hours, the free sulphur is extracted and colloidally dissolved in the water. After removal thereof as in Example 1 and after treatment with organic acid such as acetic acid, tartaric acid, citric acid, glycollic acid, amido-acetic acid, etc., and neutralization with ammonia, there is obtained a reclaimed rubber which after drying can be employed direct in most cases as an addition to fresh rubber mixtures.

Exact analyses showed that a single treatment of 3 to 4 hours give a reclaimed rubber containing no free sulphur, but still about 6.2% of combined sulphur while after a further 6 hours' treatment the combined sulphur had been reduced to 3.4%. Analysis of the soft waste rubber employed showed that it contained 8.6% of total sulphur and 2.8% of sulphur soluble in acetone.

When treating waste rubber which is mixed with textile or fibrous substances such as automobile tires, these substances must first be removed by treating the comminuted waste at 100 to 110 degrees C. with a 30% alkali solution or a 50% zinc chloride solution in a mill until the fabric has been dissolved. Other known methods of removing fibrous material may be employed. The liquid so obtained is then centrifuged or filtered and the rubber mass separated from the solution when after washing when necessary the rubber is treated as above described.

Instead of using water as dispersion medium it is also possible to employ organic hydrocarbons such as benzene, homologues thereof, benzine or other aliphatic hydrocarbons such as petroleum, oils, chlorinated hydrocarbons, etc., and as dispersion accelerators, there may be added resins, or colophony, a resinate, oleate, a salt of naphthene-disulphonic acid, fatty acids or fats. The addition in question shall be soluble in the dispersion medium employed. This emulsification has the advantage that the regeneration can be effected at atmospheric temperature or temperatures very little above.

*Example 3.*

100 parts of water are mixed with 10 parts of dichlorhydrin which partially dissolve and partially emulsify since water only dissolves 9%.

1 to 2 parts of soap from resin, fat or naphthene-disulphonic acid is added to the mixture. 10 to 20 parts of ebonite powder are then added at about 100 degrees C., and the mixture is intensively disintegrated for 2 to 3 hours when the whole ebonite mass has been transformed into an excessively fine dispersion and more or less desulphurized. A smell of sulphuretted hydrogen is observed. Further treatment is effected as in Example 1.

The regeneration can also be modified in that the waste rubber mass can be preliminarily treated by "swelling" with a suitable liquid or working with this liquid on rollers until a homogeneous mass is formed which is then subjected to disintegration as above.

After removal of the sulphur and sulphur compounds, the dispersion medium can be employed again and the dichlorhydrin can then be recovered by distillation.

After complete regeneration and washing as in Example 1, a difficultly soluble or insoluble rubber-like mass is obtained which however swells in certain hydrocarbons. The phenomenon of insolubility is apparently to be explained in that in ebonite vulcanization a polymerization of the rubber molecule also takes place and the sulphur partly plays the role of catalyst for polymerization and partly adds itself on to the rubber molecule and in such a form is dissolved by the hightly polymerized rubber.

A similar polymerization phenomenon is observed when natural or artificial rubber is exposed to light for a long time and further in certain synthetic rubbers. Since sulphur is not present in this case, it cannot therefore cause the phenomenon, which is probably due to a solution of highly polymerized parts in unpolymerized parts or vice versa. By further treatment however it is possible in certain ways to depolymerize this product.

This process has the advantage that only small quantities of the expensive organic regenerating agents are used since owing to the high dispersion obtained by the extraordinarily fine mechanical disintegration, the regenerating agent comes into the most intimate contact with the highly dispersed rubber. The chemicals employed therefore act rapidly and energetically on the rubber. In prior processes on the other hand, the chemicals only come in contact with the surface of the rubber and did not penetrate deeply enough except when using high pressure and temperature; in such cases the outer layers of the rubber were partially decomposed by the action of the reagents, the pressure and the temperature by the time the reagents reached the inner portions.

Since the devulcanization takes place at low temperatures, a catalytic reverse action of the sulphur or sulphur compounds formed does not take place as it is possible when regenerating rubber at high pressure and temperature.

Further according to this invention, the rubber which is initially in the form of crumb or powder cannot be transformed during regeneration into a tacky compact mass as was frequently the case hitherto.

The present process therefore depends on the discovery that it is possible to obtain regeneration in a simple manner at a low temperature by the simultaneous use of a liquid dispersion agent, a substance of colloidal nature as accelerator of dispersion and a saponifying and (or) swelling agent or solvent.

Although numerous processes have been hitherto proposed the above considerations will illustrate important distinguishing features of the present invention. Its commercial advantages are shown not only in regard to its cheapness, but also in regard to the quality of the products obtained.

I claim as my invention.—

1. Process of reclaiming vulcanized rubber by intensively mechanically disintegrating it in a non-solvent liquid dispersion medium until a latex-like dispersion is obtained.

2. Process of reclaiming vulcanized rubber by intensively mechanically disintegrating it in a non-solvent liquid in presence of a dispersion accelerator until a latex-like dispersion is obtained.

3. Process of reclaiming vulcanized rubber by intensively mechanically disintegrating it in a non-solvent dispersion medium in presence of an alkaline agent.

4. Process of reclaiming vulcanized rubber by intensively mechanically disintegrating it in a liquid non-solvent dispersion medium together with a small quantity of a solvent liquid.

5. Process of reclaiming vulcanized rubber by swelling it with a small quantity of a swelling agent and then intensively mechanically disintegrating the mixture in presence of a non-solvent liquid dispersion medium until a latex-like dispersion is obtained.

6. Process of reclaiming vulcanized rubber which consists in intensively mechanically disintegrating it in presence of water until a latex-like dispersion is obtained and removing the free sulphur from the rubber.

In witness whereof, I have hereunto signed my name this 30th day of Dec., 1920, in the presence of two subscribing witnesses.

HERMANN PLAUSON.

Witnesses:
HECTOR ARMSTRONG,
W. H. BELLSTON.